United States Patent

[11] 3,550,971

[72] Inventor Josef Wochnik
 Osterath, Germany
[21] Appl. No. 780,647
[22] Filed Dec. 3, 1968
[45] Patented Dec. 29, 1970
[73] Assignee Schloemann Aktiengesellschaft
 Dusseldorf, Germany
 a German company
[32] Priority Dec. 22, 1967
[33] Germany
[31] No. 1,602,179

[54] ROLL BEARINGS FOR ROLL STANDS
 7 Claims, 5 Drawing Figs.
[52] U.S. Cl. .................................................. 308/76
[51] Int. Cl. .................................................. F16c 37/00
[50] Field of Search .................................. 308/64, 76,
 68, 69, 73, 121, 240, 238

[56] References Cited
FOREIGN PATENTS
345,719 12/1920 Germany ...................... 308/121
711,527 9/1941 Germany ...................... 308/73

Primary Examiner—Fred C. Mattern, Jr.
Assistant Examiner—Frank Susko
Attorney—Holman and Stern ABSTRACT: A roll bearing for roll stands with bearing bushes as radial bearings, wherein a cooling medium, with which the heat generated in the bearing when rolling is removed, serves at the same time to lubricate the bearing, and is guided in grooves of preferably segmental cross section, which are machined in the rubbing surface of the bearing bushes, so that these grooves also serve as lubricating grooves.

INVENTOR.
JOSEF WOCHNIK

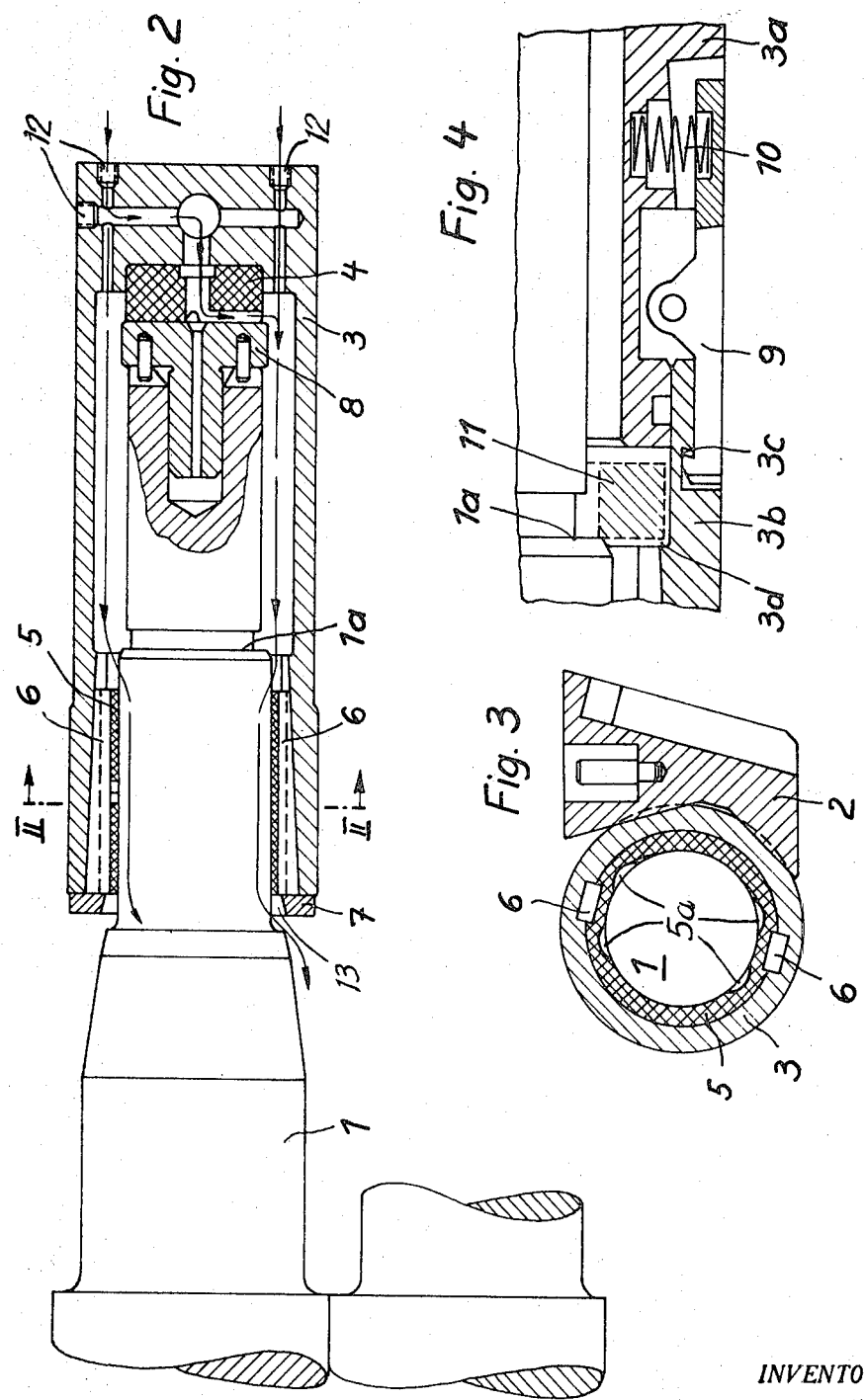

ROLL BEARINGS FOR ROLL STANDS

This invention relates to a roll bearing in roll stands, wherein bearing bushes are provided as radial bearings, and the bearing bushes are cooled by cooling media, which at the same time serve to lubricate the bearing.

It is known to journal rolls only in portions, so-called bearing elements, instead of in whole bearing bushes, and to pass cooling media between the bearing portions. These bearing portions are sometimes so arranged that they support the rolls in the direction in which the rolls tend to give way in consequence of their loading. With this arrangement it has been found that the adjusting of such bearing portions, the rotationally fast supporting of which, and their accurate readjusting, are exceedingly difficult, gives rise with a diminishing diameter of a roll neck, to even further constructional difficulties, since the external dimensions of the bearing casing of a working roll are generally bound up with the minimum external diameter (German Federal Pat. No. 738,541).

This invention therefore relates to a roll bearing the construction and operation of which are simple, and which is suitable for roll journals of any diameter.

According to the invention, this is substantially obtained, with the advantage of very simple production and manipulation, by the feature that the cooling medium, with which the heat evolved in the bearing during the rolling is removed, and which serves at the same time for lubricating the bearing, is guided in grooves which are machined in the rubbing surfaces of the bearing bushes, so that these advantageously also serve as lubricant grooves. Furthermore there is obtained, with this guidance of the cooling medium according to the invention, an optimum cooling action, since the cooling medium is brought by the grooves into direct contact with the bearing surfaces where the heat is generated.

In a further development of the invention there is provided, on both sides of a particularly severe wearing position of the bearing bushes, at least one groove extending in an axial direction of the bearing bushes, so that the bearing bushes at these places become slightly deformed, and the worn places can in this way be very accurately made good or readjusted. Hence a considerably greater period of use is obtained by means of the grooves according to the invention, as compared with conventional bearing bushes, which are exchanged for fresh bushes as soon as they are worn out at one place.

The bearing bushes are prevented from turning by keys, these keys serving at the same time, according to the invention, for the deformation of the bearing bushes or for the readjustment of the worn places. For instance the keys press for this purpose exactly between the two grooves pertaining to a strongly wearing spot on the external peripheral surface of a bearing bush, when the strongly wearing spot is located upon the internal periphery thereof.

For the grooves in the rubbing surfaces of the bearing bushes, a cross section in the shape of a segment of a circle is provided, so that notch effects of the grooves, and therefore breakages and cracks in the bearing bushes, when subjected to stress or deformation, are prevented.

According to a further feature of the invention, the bearing casing consists of the bearing neck or journal, facing the dismantling side of a roll, of a sleeve open at both ends and accommodating the radial bearing of the roll, and a sleeve closed at one end and accommodating the axial bearing of the roll. For changing the rolls it is then only necessary for the sleeve closed at one end to be removed, in order to seize the roll with a C-hook. For the connecting of the two rolls, in one of the two sleeves, spring-loaded hooks are pivotally supported, which engage in a corresponding groove in the other sleeve. In this way a quick and simple connecting and separating of the two sleeves, or, in other words an assembling and dismantling of the bearing casing formed by the two sleeves, is ensured. On the bearing neck remote from the dismantling side of the roll, the bearing casing according to the invention has an external diameter which corresponds to about the maximum diameter of the associated roll. In particular, in multiroll roll stands, the rolls admit of being dismantled easily and without previous removal of the bearing casing remote from the dismantling side.

Further features and details of one embodiment of the invention will now be described by way of example with reference to the accompanying drawings in which:

FIG. 2 shows on a larger scale, and in section a bearing of one of the working rolls of FIG. 1;

FIG. 3 shows the bearing in cross section on the line II—II in FIG. 2;

FIG. 4 shows the dismantling-side bearing of the working rolls of FIG. 1; and

Figure 1:
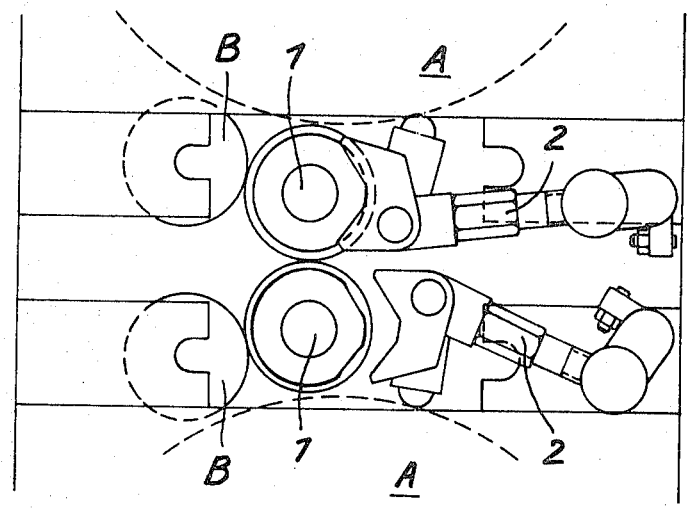
FIG. 1 is a diagrammatic end view of a multiroll roll stand.
Figure 5:
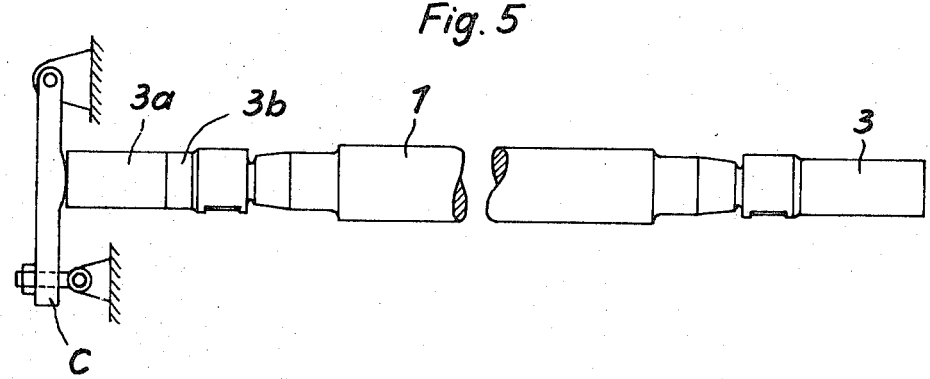
FIG. 5 shows one of the working rolls of FIGS. 1 to 4.

In a multiroll roll stand with two backing rolls A, two working rolls 1, and two supporting or pressure struts 2, the longitudinal axes of the working rolls outside the plane containing the longitudinal axes of the two backing rolls. The pressure struts 2 engage bearing casings 3 of the working rolls 1, and press the latter, for the supporting of the working rolls 1, against the supporting rollers B. The contact surfaces of the bearing casings 3 that face the pressure struts 2 are here of wedge-shaped formation, and bear against corresponding contact surface of the pressure struts 2, so that the bearing casing 3 is rotationally fast on the pressure strut 2, so long as this pressure strut 2 is in its working position.

By so-called hinged flaps C, between which each working roll 1, with its bearing casings 3, is arranged in the roll stand, any axial displacement of the working rolls 1 is prevented.

Each bearing casing 3 is constructed as a sleeve closed at one end and accommodates a bearing bush 5 consisting of a resilient plastic material. In the bottom or inner end of the bearing casing is embedded a bearing block 4, likewise consisting of a resilient plastic material. The bearing bush 5 here forms the radial bearing for the working roll 1, whilst the working roll 1 is supported by way of bearing necks 8, which engage in the ends thereof, in an axial direction, on the bearing blocks 4. On the outer periphery of each bearing bush 5, longitudinal grooves are machined, in which keys or wedges 6 slide. These longitudinal grooves, that is grooves extending in the axial direction of the bearing bushes 5, upon the external periphery of the bearing bushes 5, are located exactly over the loading places that occur at the upper and lower sides of the bearings during the idle running of the working rolls 1, so that the bearing bushes 5, in consequence of their reduced wall thickness, swell least at these places. Since the working rolls 1, upon a swelling of the synthetic material, immediately shut off the material entering its bearing seat, the bearing bushes 5 undergo at the places above which the grooves are located seen absolutely, the minimum wear. That is to say, at these places, the bearing bushes are advantageously particularly true to gauge. The keys 6 bear moreover on the internal wall surface of the bearing casing 3, and serve both for clamping the bearing bush 5, and also, like fitting keys, for securing the bearing bush 5 against rotation in the bearing casing 3. For adjusting the keys there serves a cover 7, which at the same time closes the bearing casing 3 except for a gap.

When in operation cooling fluid is forced through inlets 12 in the bottom or closed end of the sleeve, which forms part of the bearing casing 3, into the space between the roll neck of the working roll 1 and the bearing casing 3, and in so doing part of it cools and lubricates the contact surfaces between the neck 8 and the slide block 4. The cooling medium flows from the inlets 12 into recesses 5a in the bearing bush 5, which are constructed as longitudinal grooves of segmental cross section, and are located on the internal surface of the bearing bush 5, near to and on both sides of each key 6. Owing to the segmental shape of the groove cross section, the lateral margins of the grooves meet the internal wall surface of the bearing bush at an obtuse angle. The cooling medium flows through the recesses in the bearing bush 5, and in so doing cools and lubricates the bearing neck of the working roll 1 in the bearing bush 5, and then passes out of the bearing casing 3 through the gap 13 between the cover 7 and the bearing neck of the working roll 1.

According to FIG. 4, the bearing casing 3, on the dismantling side of the working roll 1, consists of a sleeve 3a closed at one end, in the bottom or inner end of which the bearing block 4 is embedded, and of a sleeve 3b, which accommodates the bearing bush 5, and upon which the sleeve 3a is mounted in a fluidtight manner. Two hooks 9, spaced apart by 180° upon the periphery of the sleeve 3a and pivotally supported in the sleeve 3a, are urged by springs 10 to engage in a groove 3c of the sleeve 3b, thus connecting the latter firmly with the sleeve 3a.

For the dismantling of a working roll 1, the hinged flaps C pertaining to the working roll are released on the dismantling side, the hooks 9 are moved out of the groove 3c by hand and the sleeve 3a is removed from the bearing neck of the working roll 1, so that a C-hook can be mounted on the bearing neck, and the working roll, after a lifting of the pressure struts 2, can be drawn out of the roll stand in the longitudinal direction. The mounting of the working roll 1 is effected analogously to the dismantling, with the additional measure that the sleeve 3b is displaced upon the bearing neck of the working roll 1 in such a way that the hooks 9 of the sleeve 3a, after they have been placed upon the bearing neck, engage reliably in the groove 3c of the sleeve 3b. For this there serves for instance a magnet ring 11 shown in dotted lines, which is itself connected with the C-shaped hook, and bears, upon the entry of the working roll 1, on a step or ledge 1a of the bearing neck, and the sleeve 3b with its inner collar 3d, in the position thereof which is requisite for the assembling of the bearing casing 3, is arrested upon the bearing neck until the further arresting of the sleeve 3b in the position thereof which is required for the assembling of the bearing casing 3, is established by the pressure struts 2.

I claim:

1. A roll bearing for roll stands, comprising: a bearing bush acting as a radial bearing, the said bearing bush being formed with peripheral grooves adapted for the flow of a medium which is capable of acting both as a cooling medium and as a lubricant, a bearing casing consisting of a sleeve open at both ends and a sleeve closed at one end, the sleeve open at both ends containing the radial bearing of the roll, an axial bearing for the roll, the said axial bearing being accommodated in the sleeve closed at one end, and a C-shaped hook for withdrawing the roll from the closed sleeve.

2. A roll bearing as claimed in claim 1, further comprising: spring-loaded hooks pivotally mounted in one of the two sleeves, the said hooks being adapted to engage in the other sleeve for the purpose of releasably connecting the two sleeves.

3. A roll bearing for a multiroll stand, comprising: a tubular bearing casing, closed at one end, a resilient plastic radial bearing bush inserted in the open end of the bearing casing, a resilient plastic bearing block in the bearing casing, near its closed end, the end closure of the casing being formed with at least one inlet for the admission of a lubricating and cooling medium, and the said radial bearing bush being formed with longitudinal grooves in the upper and lower regions of its internal periphery for the passage of the lubricating and cooling medium, thus reducing the wall thickness of the bearing bush in these upper and lower regions.

4. A roll housing as claimed in claim 3, the bearing bush being formed with two longitudinal keyways, one in the upper region and the other in the lower region of its external surface, each external keyway being located between two of the said internal grooves, thus further reducing the wall thickness of the radial bearing bush in these regions, and keys in the keyways, to prevent the plastic bearing bush rotating relatively to the bearing casing.

5. A roll bearing as claimed in claim 4, the keys being longitudinally slidable in the keyways, to enable those regions of the radial bearing bush that are of reduced wall thickness to be readjusted to compensate for wear.

6. A roll bearing as claimed in claim 4, wherein the lateral margins of the said internal grooves meet the internal wall surface of the bearing bush at an obtuse angle.

7. A roll bearing as claimed in claim 3, the external diameter of the bearing casing containing the bearing journal at the end remote from the dismantling end of the casing being of about the same external diameter as the associated roll.